United States Patent
Koga et al.

[11] Patent Number: 6,129,437
[45] Date of Patent: Oct. 10, 2000

[54] IMAGE DISPLAY APPARATUS

[75] Inventors: Ritsuo Koga; Hideto Kubouchi, both of Tokyo, Japan

[73] Assignee: Plus Corporation, Tokyo, Japan

[21] Appl. No.: 09/125,661

[22] PCT Filed: Dec. 28, 1997

[86] PCT No.: PCT/JP97/04822

§ 371 Date: Nov. 12, 1998

§ 102(e) Date: Nov. 12, 1998

[87] PCT Pub. No.: WO98/29773

PCT Pub. Date: Jul. 9, 1998

[30] Foreign Application Priority Data

Dec. 26, 1996 [JP] Japan ................................. 8-347331

[51] Int. Cl.[7] ............................................. G03B 21/28
[52] U.S. Cl. ............................. 353/98; 353/37; 348/743
[58] Field of Search ................................. 353/31, 38, 98, 353/99; 348/742, 743, 771

[56] References Cited

U.S. PATENT DOCUMENTS

| | | | |
|---|---|---|---|
| 5,098,184 | 3/1992 | Van Den Brandt et al. | 353/38 |
| 5,442,414 | 8/1995 | Janssen et al. | 353/98 |
| 5,467,146 | 11/1995 | Huang et al. | 348/743 |
| 5,612,753 | 3/1997 | Poradish et al. | 348/742 |
| 5,716,118 | 2/1998 | Sato et al. | 353/98 |
| 5,871,266 | 2/1999 | Negishi et al. | 353/98 |
| 5,902,033 | 5/1999 | Levis et al. | 353/98 |
| 5,905,545 | 5/1999 | Poradish et al. | 348/743 |

FOREIGN PATENT DOCUMENTS 8-129138  5/1996  Japan.

OTHER PUBLICATIONS

"Optics" vol. 25, No. 6, pp. 313–314 (1996).

*Primary Examiner*—William Dowling

[57] ABSTRACT

An image display apparatus includes an arc lamp as a white-light source, an ellipsoidal mirror for collecting a light beam from the arc lamp, a color filter for producing sequentially three primary colors of light from the white-light beam, a condenser lens for transmitting a light beam transmitted through the color filter, and a single spherical mirror or non-spherical mirror for reflecting the light beam transmitted through the condenser lens. The image display apparatus further includes a digital micromirror device. This device receives the light beam reflected from the reflecting mirror and produces on and off states by varying the tilt of a micromirror of each of a number of two-dimensionally arrayed pixels to vary the angle of reflection of the light beam reflected therefrom. From there, a projection lens enlarges and projects the light beam reflected from a pixel. The spherical mirror or non-spherical mirror is arranged such that the normal of the mirror at an intersection where the optical axis of an optical illumination module including the arc lamp, the ellipsoidal mirror and the condenser lens intersects the mirror, is inclined by a predetermined angle.

30 Claims, 7 Drawing Sheets

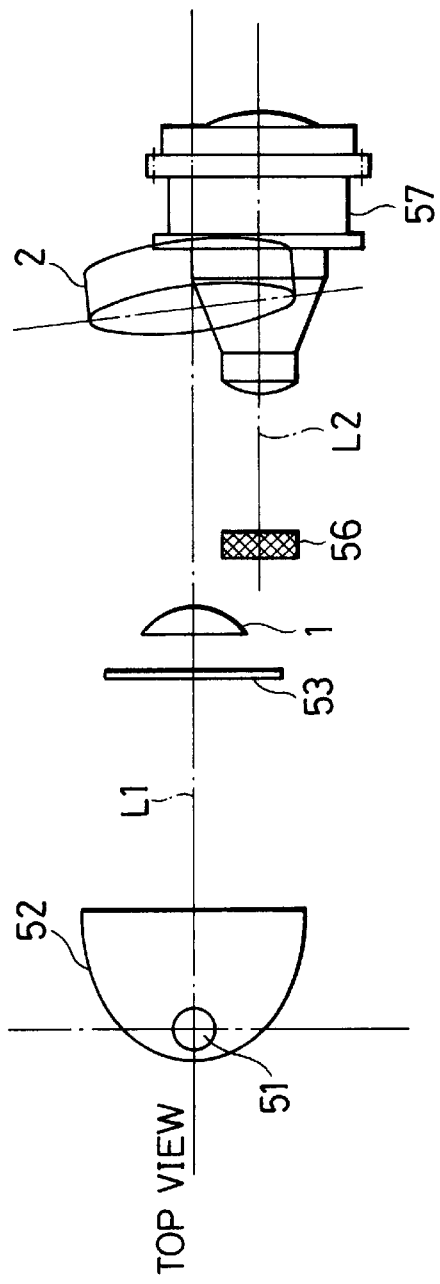
FIG. 2 TOP VIEW
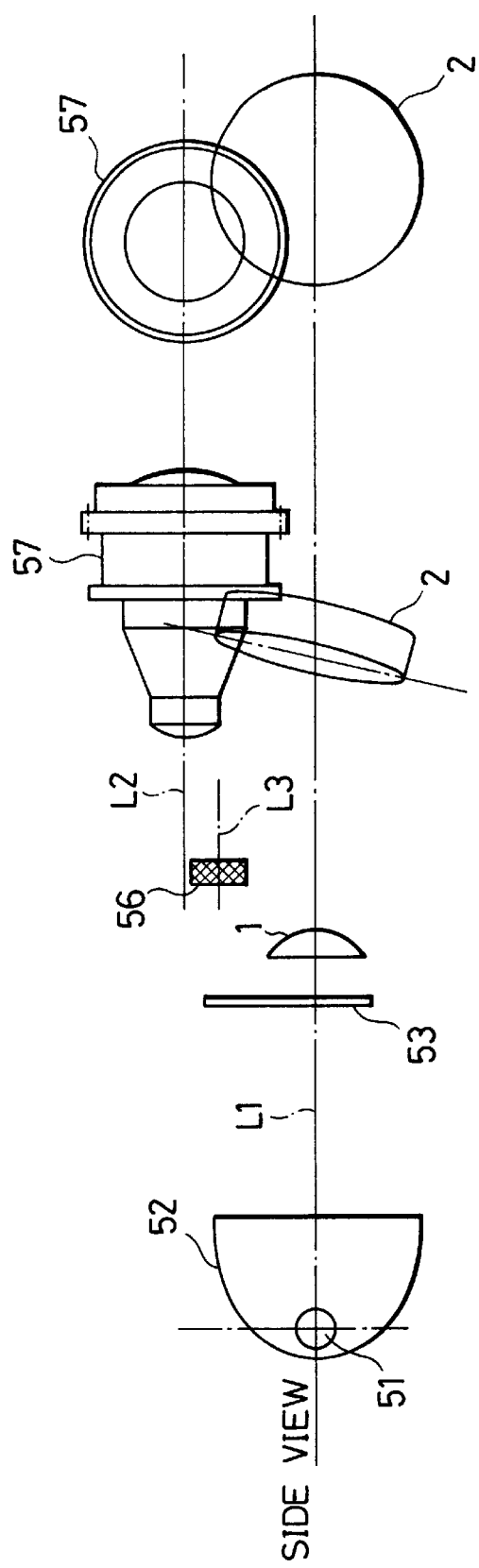
FIG. 3 SIDE VIEW

FIG. 8
CONVENTIONAL
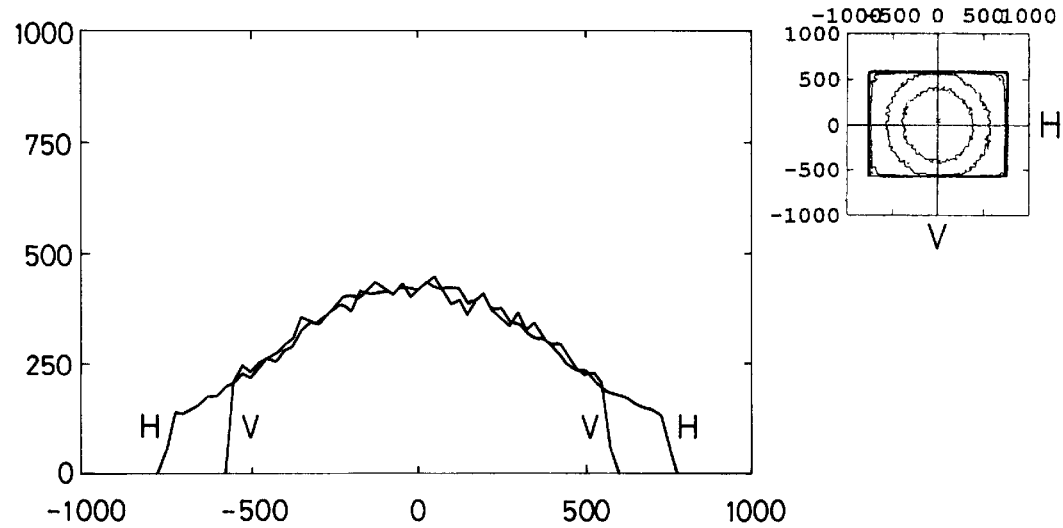

FIG.10
CONVENTIONAL
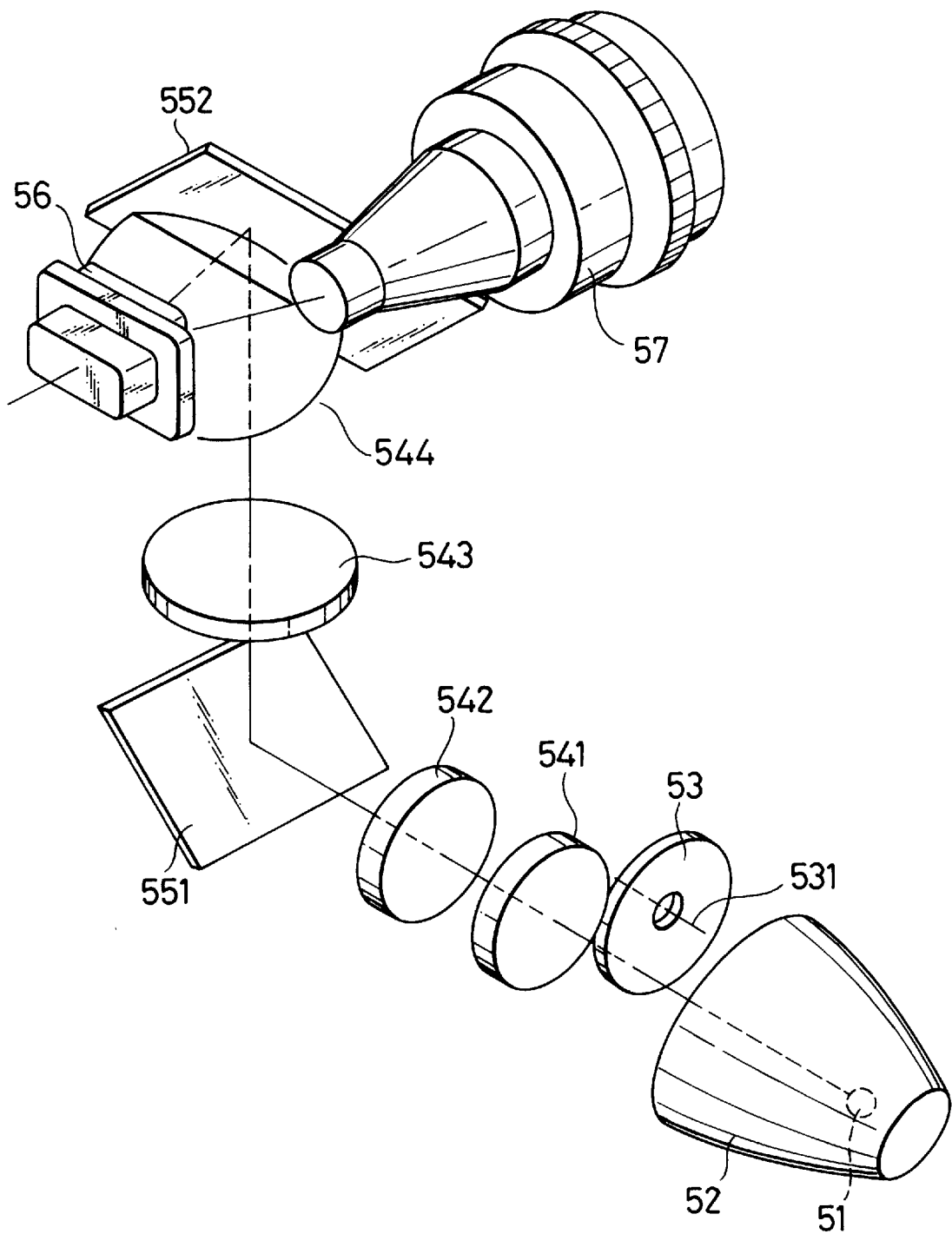

IMAGE DISPLAY APPARATUS

This application is the national phase under 35 U.S.C. §371 of prior PCT International Application No. PCT/JP97/04822 which has an International filing date of Dec. 25, 1997 which designated the United States of America, the entire contents of which are hereby incorporated by reference.

BACKGROUND OF THE INVENTION

1. Field of the Invention

The present invention relates to a projection-type image display apparatus for use in a projection-type high-definition television system or video projector. More particularly, the present invention relates to an image display apparatus having a unique feature in the structure of the optical system for projecting a color image.

2. Description of the Related Art

One of known conventional projection-type image display apparatus is a projection-type color liquid-crystal display apparatus using a liquid-crystal display panel.

The projection-type color liquid-crystal display apparatuses are roughly divided into a three-panel color liquid-crystal display apparatus having three liquid-crystal display panels for red, green and blue primaries and a single-panel color liquid-crystal display apparatus having a single liquid-crystal display panel with a mosaic- or stripe-patterned tricolor filter.

The three-panel color liquid-crystal display apparatus comprises an optical system for converting a white light into red, green and blue primaries, and a liquid-crystal display panel for controlling luminance of each color to form an image.

The final color image is produced and presented by optically superimposing red, green, and blue color images.

The single-panel color liquid-crystal display apparatus introduces a white light into a single liquid-crystal display panel with a mosaic- or stripe-patterned tricolor filter to form and present a color image.

Besides the three-panel and single-panel projection-type liquid-crystal display apparatuses, another projection-type color image display apparatus using a digital micromirror device (DMD: trade name of Texas Instruments) is recently available (reference is made to magazine "Optics", vol. 25, No. 6, p.313–314, 1996).

The liquid-crystal panel used in the three-panel or single-panel projection-type liquid-crystal display apparatus, as already known, controls a number of two-dimensionally arrayed cells of liquid-crystal molecules in orientation to vary polarization of light, thereby switching on and off the transmission of light.

The above-cited DMD, having a two-dimensional array of a number of pixels each having a micromirror, controls the tilt of each mirror individually through the effect of electrostatic field caused by a memory element arranged respectively for each pixel and varies the angle of reflection of reflected light ray thereby causing on/off state.

FIG. 9 shows the operation of the micromirror arranged for each pixel in DMD. Diagrammatically shown in FIG. 9 are micromirrors 101 through 105 and a projection lens 110. As shown, the pixels corresponding to micromirrors 103 and 105 are in the on state.

Light rays reflected off the micromirrors 101, 102, and 104 of pixels in the off state are not directed to the projection lens 110. Light rays reflected off the micromirrors 103 and 105 of the pixels in the on state are directed to the projection lens 110 and forms an image on a screen.

The tilt angle of the micromirror of a pixel in the on state is 10 degrees or so with respect to a horizontally aligned micromirror.

The advantages of DMD over the liquid-crystal display panel employing a polarizer include a better utilization of light, heat resistance property, high-speed response characteristics, and the like.

FIG. 10 is a perspective view of an optical system for a conventional projection-type color image display apparatus using a DMD.

A white light arc lamp (light emission point) 51 such as a xenon arc lamp is arranged at one focus of a collector ellipsoidal mirror 52.

The light beam emitted from the arc lamp 51 is focused at the other focus of the ellipsoidal mirror 52, thereby forming a virtual secondary light source.

A rotatable color filter 53 is placed at the position of the secondary light source (the other focus of the ellipsoidal mirror 52).

As shown in FIG. 11, the color filter 53 has a ring portion which is partitioned into transmission-type filters 53R, 53G and 53B correspondingly to three primaries of red, green and blue. Designated 531 is the axis of rotation of the color filter 53.

When rotated about the axis of rotation 531 in parallel with the optical axis of light beam from the arc lamp 51 shown in FIG. 10, the color filter 53 converts sequentially the white light into red, green and blue colors.

Referring to FIG. 10, a light beam passing through the color filter 53 is transmitted through condenser lenses 541, 542, reflected from a plane mirror 551, and transmitted through a condenser lens 543. The light beam transmitted through the condenser lens 543 is reflected from a plane mirror 552, transmitted through a condenser lens 544, and introduced into DMD 56. The light beam reflected from DMD 56 is admitted to a projection lens 57.

The condenser lenses 541–544 have a function of condensing red, green or blue light beam at an entrance pupil of the projection lens 57 through the micromirrors of pixels in the on state of DMD 56. Furthermore, these condenser lenses 541–544 have a function of reducing nonuniform illumination caused by uneven illuminance on the screen.

The plane mirrors 551 and 552 have a function of bending, in a three-dimensional space, the optical path of an optical illumination module that is complicatedly routed through the condenser lenses 541–544. The optical illumination module refers to an optical system constituted by components present in the optical path extending along the light beam from the arc lamp 51 to DMD 56.

The reason the optical path of the optical illumination module is made complicated is as follows. To make DMD 56 to work correctly, the angle of incidence of a light beam to the surface of each micromirror in DMD 56 is necessarily great (80 degrees, for example), and as a result, the components constituting the optical illumination module, such as the condenser lenses, are subject to mechanical contact with or interference with the projection lens 57.

To preclude mechanical contact or interference, the plane mirrors 551 and 552 are necessarily three-dimensionally placed, as shown in FIG. 10, thereby making the optical path of the optical illumination module complex.

The central axis of DMD 56 is not colinearly aligned with the optical axis of the projection lens 57, and DMD 56 is offset (shifted) from the optical axis of the projection lens 57. In the conventional art, the projection lens 57 is therefore used partially rather than in its full angle of view.

Because of its complex structure, the three-panel projection-type color image display apparatus is bulky and costly.

Since the single-panel projection-type color display apparatus features a relatively simple optical structure and small component count, compact and low-cost design is easily implemented. On the other hand, the use of a color filter presents difficulty in full utilization of light beams from the light source and results in a darker image. If luminance of the light source is raised to compensate for this disadvantage, components such as the liquidcrystal panel must be provided with sufficient cooling steps.

The conventional projection-type color image display apparatus using DMD is particularly heat-resistant, and presents a high resolution because of a fine grid as compared with the liquid-crystal display panel. However, the DMD color image display apparatus has the following disadvantages.

As is apparent from FIG. 10, the component count of the optical illumination module is so large that a potential high luminance image advantage of DMD cannot be fully exploited.

Furthermore, since the optical illumination module is arranged three-dimensionally, the assembly and adjustment process is time-consuming and the apparatus becomes bulky and costly.

It is an object of the present invention to provide an image display apparatus that presents a high-luminance and high-illuminance color image through high utilization of a light beam.

It is another object of the present invention to provide an image display apparatus that implements compact and low-cost design by reducing a component count of an optical illumination module.

SUMMARY OF THE INVENTION

The image display apparatus of the present invention comprises a white-light source, a collector mirror for collecting a light beam from the white-light source to form a virtual secondary light source, a color filter, disposed at the position of the virtual secondary light source, for producing sequentially three primaries of light from the white-light beam, a condenser lens for allowing to be transmitted therethrough a light beam transmitted through the color filter, a reflecting mirror for reflecting the light beam transmitted through the condenser lens, reflection display means which receives the light beam reflected from the reflecting mirror and produces on and off states by varying the tilt of a micromirror of each of a number of two-dimensionally arrayed pixels to vary the angle of reflection of the light beam reflected therefrom, and a projection lens which receives the light beam reflected from a pixel in the on state and enlarges and projects the received light beam.

The construction unique to the present invention is that the reflecting mirror is constituted by a single concave mirror such as a spherical or non-spherical mirror. A normal of the reflecting mirror occurs at an intersection where the optical axis of the optical illumination module including the white-light source, the collector mirror and the condenser lens intersects the reflecting mirror. If is inclined by a predetermined angle.

The optical components are arranged such that the optical axis of the projection lens is generally in parallel with the optical axis of the optical illumination module including the white-light source, the collector mirror, and the condenser lens. Alternatively, the optical components are arranged such that the optical axis of the projection lens lies in a plane perpendicular to the optical axis of the optical illumination module.

According to the present invention thus implemented, the bending of the optical axis is only once performed by the reflecting mirror such as the spherical mirror or the non-spherical mirror. The construction of the optical illumination module is simple with a smaller component count. The assembly and adjustment process of the optical components is simplified, and a compact and low-cost design is thus implemented.

The reduced number of condenser lenses and reflecting mirrors lowers loss arising from light absorption and scattering. It further makes image luminance higher and improves color reproducibility (red color in particular).

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a top view showing the actual mounted state of optical components of the first embodiment of the present invention;

FIG. 3 is a side view showing the actual mounted state of the optical components of the first embodiment of the present invention;

FIG. 8 shows an illuminance distribution of a conventional projection-type color image display apparatus;

FIG. 10 is a perspective view showing a conventional projection-type color image display apparatus using DMD.

DESCRIPTION OF THE PREFERRED EMBODIMENTS

Referring to the associated drawings, the embodiments of the present invention are now discussed in detail.

Figure 1:
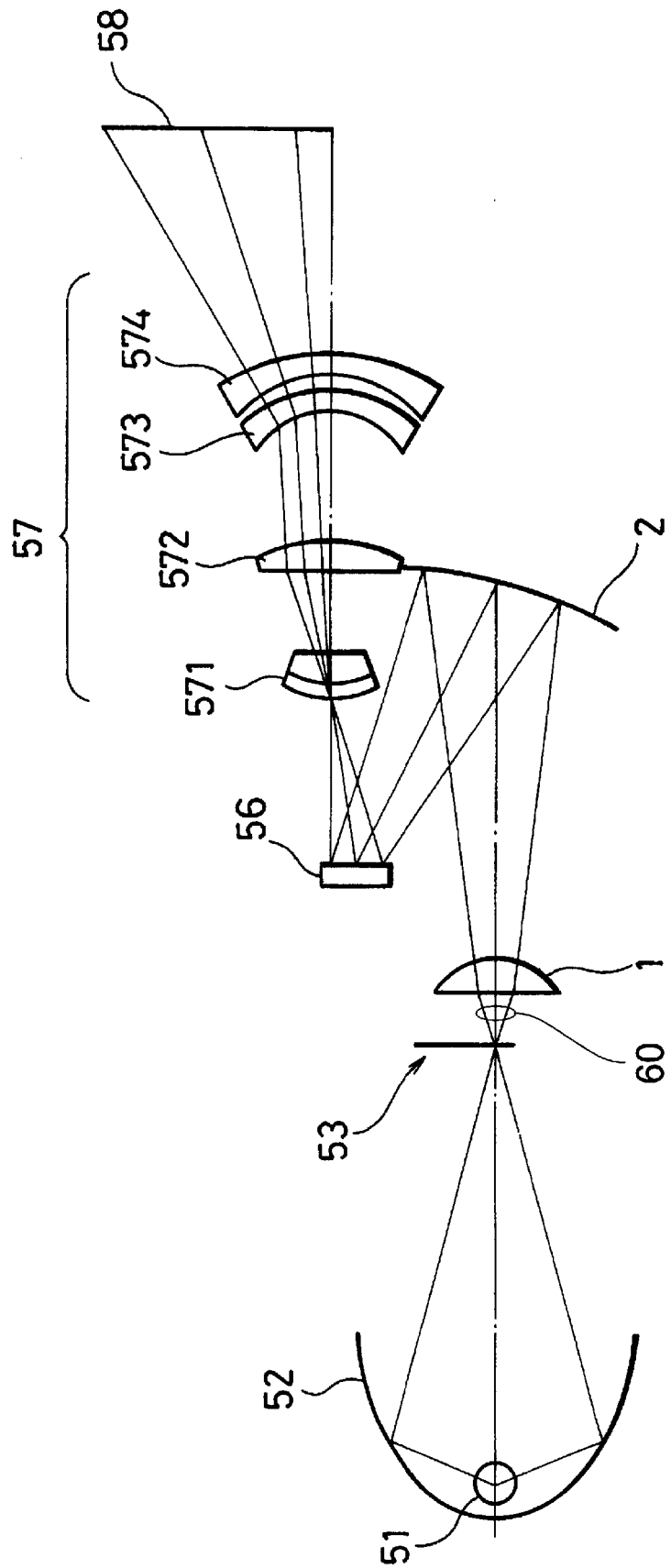
FIG. 1 shows the construction of an optical system of a first embodiment of the present invention.

FIG. 1 shows the construction of the optical system of a first embodiment of the present invention.

As already described, a white light arc lamp (light emission point) 51 is arranged at one focus of a collector ellipsoidal mirror 52. The light beam emitted from the arc lamp 51 is focused at the other focus of the ellipsoidal mirror 52. The light beam emitted from the arc lamp 51 is thus focused at the other focus of the ellipsoidal mirror 52, thereby forming a virtual secondary light source.

Figure 11:
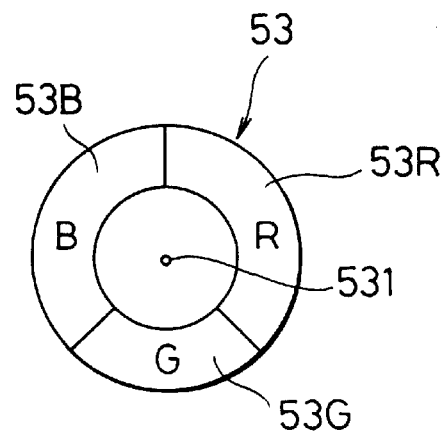
FIG. 11 is an explanatory view of a color filter used in the conventional projection-type color image display apparatus using DMD and in each embodiment of image display apparatus of the present invention.

A rotatable color filter 53 is placed at the focal position of the secondary light source (the other focus of the ellipsoidal mirror 52). The color filter 53 can be, for example, similar to that shown in FIG. 11. As shown in FIG. 11, the color filter 53 has a ring portion which is partitioned into transmission-type filters 53R, 53G and 53B correspondingly to three primaries of red, green and blue.

The light beam reflected from the ellipsoidal mirror 52 is introduced into the color filter 53. The smaller the angle of incidence of the light beam to the color filter 53, the easier the design of the optical system and the better the red color reproducibility.

In this embodiment, at least a condenser lens 1 (two condenser lenses, for example) having a positive refractive power and a spherical mirror 2 as a path bending mirror are used to substitute for the four condenser lenses 541–544 and two plane mirrors 551 and 552 already described in connection with the conventional art with reference to FIG. 10.

The spherical mirror 2 and DMD 56 are arranged such that the light beam reflected from the spherical mirror 2 enters DMD 56 at a high angle, namely a small angle of incidence.

The condenser lens 1, a convex lens, has functions of guiding, to the spherical mirror 2, the light beam transmitted through the color filter 53 with the spreading of the light beam being controlled and reducing nonuniform illumination being reduced on a screen 58.

The condenser lens 1 may be coated with a heat-wave reflecting film or may be manufactured of a heat-resistant glass material capable of absorbing heat wave to eliminate unwanted heat wave coming in from the light source.

A rod lens or flyeye integrator 60 is preferably provided between the color filter 53 and the condenser lens 1 to reduce nonuniform illumination on the screen 58.

The spherical mirror 2 has a concave surface as its reflecting surface, and is arranged to be out of alignment with the optical axis of the optical illumination module including the arc lamp 51, ellipsoidal mirror 52 and condenser lens 1. The phrase "out of alignment" means that the normal of the spherical mirror 2 where the optical axis of the arc lamp 51, ellipsoidal mirror 52 and condenser lens 1 intersects the reflecting surface of the spherical mirror 2 is inclined.

The spherical mirror 2 has the functions of reflecting and converging the light beam transmitted through the condenser lens 1, and guiding the light beam to DMD 56 to introduce the light beam to DMD 56 at a high angle.

The spherical mirror 2 is coated with aluminum film or is manufactured of a properly selected glass material to transmit the heat wave therethrough to remove it.

Light beams reflected from micromirrors of pixels in the on state, out of the light beams entering DMD 56 after being reflected from the spherical mirror 2, are introduced in the projection lens 57 along the optical path as shown, and form an image on the screen 58. The projection lens 57 preferably includes lenses 571–574.

Light beams (not shown) reflected from micromirrors of pixels in the off state are not introduced into the projection lens 57. Thereby, they do not contribute to image formation.

Figure 9:
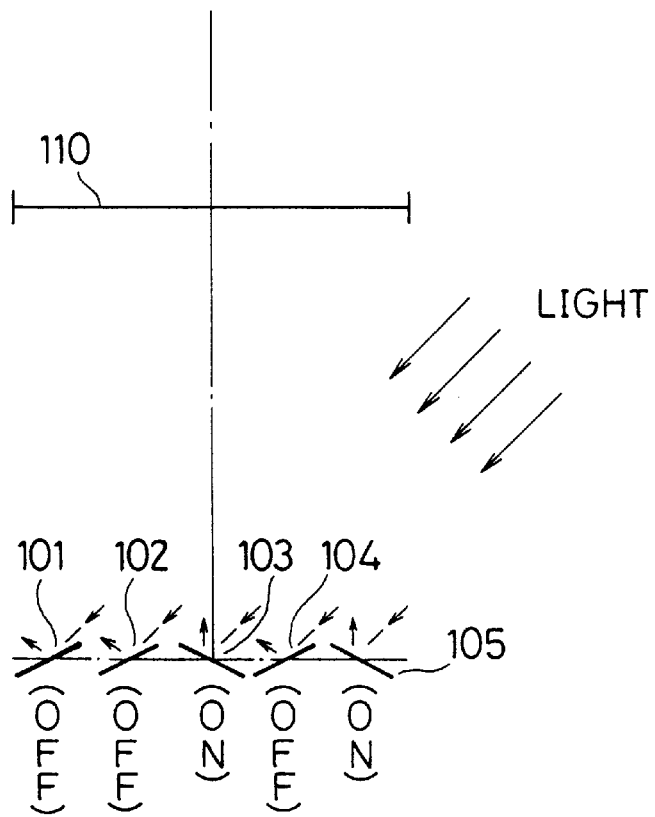
FIG. 9 shows the operation of micromirrors of pixels of DMD.

The micromirrors of the pixels in the on state are like micromirrors 103 and 105 shown in FIG. 9 for example, and the micromirrors of the pixels in the off state are like micromirrors 101, 102, and 104 shown in FIG. 9 for example.

The color image is presented on the screen 58 using the color filter 53 and DMD 56 as described below.

To present part of an image in red, for example, the micromirror of the pixel of a predetermined address in DMD 56 is turned on, and a light beam transmitted through the transmission-type filter 53R for red is reflected by the micromirror and introduced into the projection lens 57. The same method applies to present the image in green and in blue. Light beams transmitted through the transmission-type filters 53G and 53B for green and blue, respectively, are reflected by micromirrors of pixels in the on state of predetermined addresses and then introduced into the projection lens 57. By performing these operations fast sequentially, an image of any of primaries of light or of any arbitrary color is displayed on the screen 58.

A controller for issuing electrical signals to DMD 56 and a driver for the color filter 53 are not shown.

FIG. 2 is a top view showing the actual mounted state of optical components of the first embodiment, and FIG. 3 is a side view showing the actual mounted state of the optical components of the first embodiment. FIG. 3 also shows on its right-hand portion a front view of the optical components.

Referring to FIGS. 2 and 3, in this embodiment, the optical axis L1 of the optical illumination module including the arc lamp 51, ellipsoidal mirror 52, color filter 53 and condenser lens 1, the optical axis L2 of the projection lens 57 constituting an optical imaging module, and the axis L3 perpendicular to the surface of incidence of DMD 56 as reflection display means are generally parallel in a three-dimensional space. The optical imaging module refers to an optical system constituted by components present in the optical path extending from DMD 56 to the projection lens 57 to the screen 58.

When DMD 56 is mounted on a board, the board may block the optical axis L1 extending through the condenser lens 1.

A second embodiment of the present invention has been developed to resolve such a problem.

Figure 4:
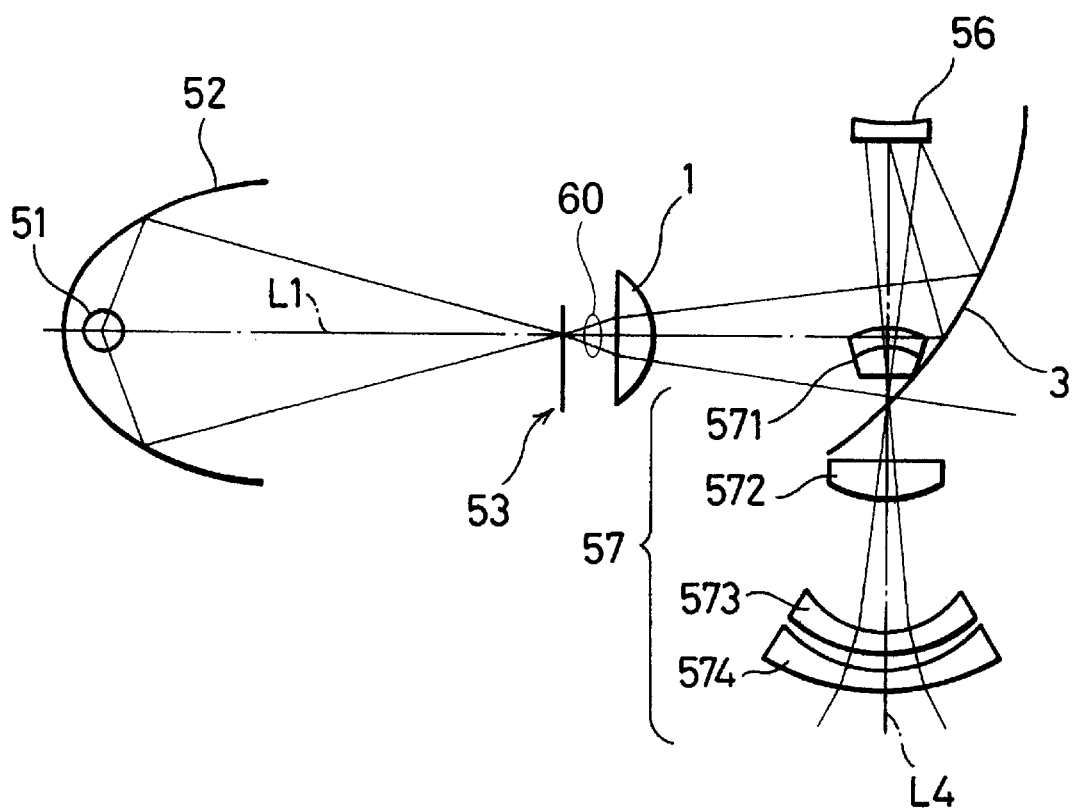
FIG. 4 shows the construction of an optical system of a second embodiment of the present invention.

FIG. 4 shows the construction of the optical system of the second embodiment. In this embodiment, the optical components of the optical illumination module and the optical imaging module are arranged such that the optical axis L4 of the projection lens 57 (including lenses 571–574) lies in a plane perpendicular to the optical axis L1 of the optical illumination module including the arc lamp 51, ellipsoidal mirror 52, color filter 53 and condenser lens 1.

In this embodiment, a non-spherical mirror 3 with a concave surface as a reflecting surface is used as a reflecting mirror.

Referring to FIG. 4, a light beam from the arc lamp 51 passes through the ellipsoidal mirror 52, color filter 53, and condenser lens 1 and is reflected by the non-spherical mirror 3, and enters DMD 56 at a high angle, namely a small angle of incidence.

The operation of the non-spherical mirror 3 is now described.

If a spherical mirror is used at some degree of tilted position, the light beam reflected from the spherical mirror may not be efficiently introduced into DMD 56 because of aberration due to the spherical mirror. Even if the light beam reflected from the spherical mirror is successfully introduced into DMD 56, it may fail to enter at a predetermined high angle. Furthermore, nonuniform illumination may be increased.

In this embodiment, the use of the non-spherical mirror 3 corrects aberration involved in the tilt of the mirror so that the light beam is efficiently introduced into DMD 56 at a predetermined angle.

The surface of the non-spherical mirror 3 is preferably paraboloidal (parabolic) in view of ease of production.

FIGS. 5–8 show computed results of illuminance distribution on the screen using the data of the optical systems in the above embodiments.

Figure 5:
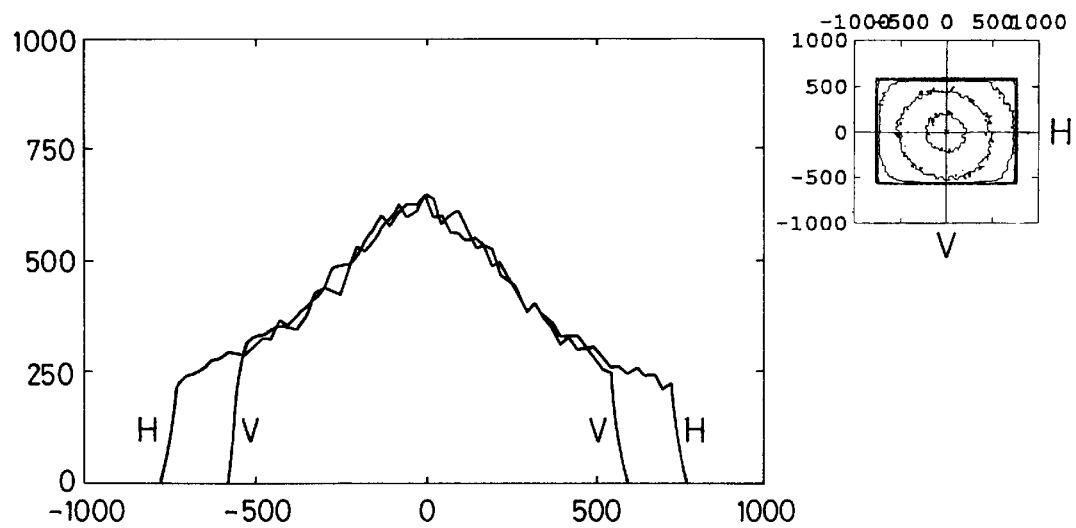
FIG. 5 shows an illuminance distribution of the image display apparatus of the first embodiment of the present invention when one condenser lens is used.
Figure 6:
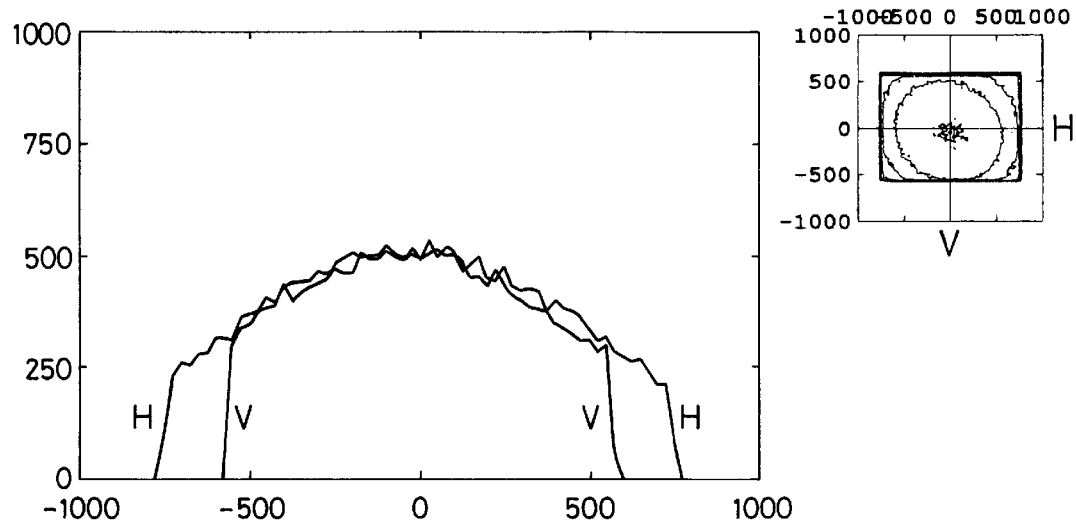
FIG. 6 shows an illuminance distribution of the image display apparatus of the first embodiment of the present invention when two condenser lenses are used.
Figure 7:
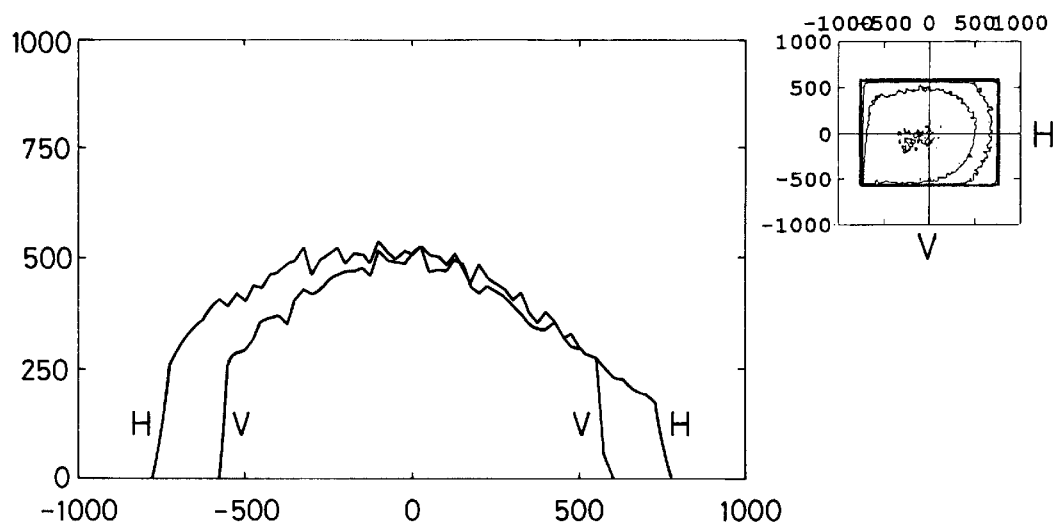
FIG. 7 shows an illuminance distribution of the image display apparatus of the second embodiment.

FIG. 5 shows an illuminance distribution on the screen of the image display apparatus of the first embodiment when one condenser lens is used; FIG. 6 shows an illuminance distribution on the screen of the image display apparatus of the first embodiment when two condenser lenses are used; FIG. 7 shows an illuminance distribution on the screen of the image display apparatus of the second embodiment; and FIG. 8 shows an illuminance distribution on the screen of the conventional projection-type color image display apparatus shown in FIG. 10.

In FIGS. 5–8, the abscissa represents the position on a horizontal line H or a position on a vertical line V in a screen (73 inches wide, aspect ratio of 3:4, or 1:1.33). As shown on an upper side portion in each of FIGS. 5–8, the positions on the horizontal line and vertical line on the screen are graduated over a range of ±1000 with 0 positions centered.

In the illuminance distribution on the left-hand portion of each of FIGS. 5–8, the ordinate represents the absolute value of illuminance within a range from 0 to 1000.

As apparent from the comparison of FIGS. 5 and 7 to FIG. 8, illuminance on the screen in the image display apparatus of the preceding embodiments is about 1.5 times greater than the optical system of FIG. 10.

With two condenser lenses used, illuminance on the screen in FIG. 6 is even more greater than that in FIG. 5.

The image display apparatus of the present invention finds applications in a projection-type HDTV system, a video projector, and other apparatuses for projecting a color image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display apparatus comprising:
   a light source;
   a collector mirror for collecting light from the light source to form a virtual secondary light source;
   a color filter for sequentially producing three primary colors of light;
   a condenser lens for transmitting a light beam transmitted through the color filter;
   a reflecting mirror for reflecting the light beam transmitted through the condenser lens;
   a reflection display which receives the light beam reflected from the reflecting mirror and produces on and off display states by varying tilt of a micromirror of a number of two-dimensionally arrayed pixels and thereby varying an angle of reflection of the light beam reflected therefrom; and
   a projection lens which receives the light beam reflected from a pixel of the reflection display in the on state and enlarges and projects the received light beam,
   wherein the reflecting mirror is constituted by a single concave mirror, and wherein the single concave mirror is arranged to be inclined with respect to an optical axis of an optical illumination module including the light source, the collector mirror and the condenser lens.

2. An image display apparatus according to claim 1, wherein the optical axis of the optical illumination module is generally parallel with an optical axis of the projection lens.

3. An image display apparatus according to claim 1, wherein an optical axis of the projection lens is generally perpendicular to the optical axis of the optical illumination module.

4. An image display apparatus according to claim 1, wherein the reflecting mirror is a spherical mirror.

5. An image display apparatus according to claim 1, wherein the reflecting mirror is a non-spherical mirror.

6. An image display apparatus according to claim 5, wherein the reflecting mirror is a paraboloidal mirror.

7. An image display apparatus according to claim 1, wherein the reflecting mirror is arranged such that the optical axis of the optical illumination module intersects the reflecting mirror at a predetermined angle.

8. An image display apparatus according to claim 4, wherein the spherical mirror is arranged such that the optical axis of the optical illumination module intersects the spherical mirror at a predetermined angle.

9. An image display apparatus according to claim 5, wherein the non-spherical mirror is arranged such that the optical axis of the optical illumination module intersects the non-spherical mirror at a predetermined angle.

10. An image display apparatus according to claim 6, wherein the paraboloidal mirror is arranged such that the optical axis of the optical illumination module intersects the paraboloidal mirror at a predetermined angle.

11. An image display apparatus according to claim 1, wherein a rod lens is arranged between the color filter and the condenser lens.

12. An image display apparatus according to claim 4, wherein a rod lens is arranged between the color filter and the condenser lens.

13. An image display apparatus according to claim 5, wherein a rod lens is arranged between the color filter and the condenser lens.

14. An image display apparatus according to claim 6, wherein a rod lens is arranged between the color filter and the condenser lens.

15. An image display apparatus according to claim 7, wherein a rod lens is arranged between the color filter and the condenser lens.

16. An image display apparatus according to claim 1, wherein a flyeye integrator is arranged between the color filter and the condenser lens.

17. An image display apparatus according to claim 4, wherein a flyeye integrator is arranged between the color filter and the condenser lens.

18. An image display apparatus according to claim 5, wherein a flyeye integrator is arranged between the color filter and the condenser lens.

19. An image display apparatus according to claim 6, wherein a flyeye integrator is arranged between the color filter and the condenser lens.

20. An image display apparatus according to claim 7, wherein a flyeye integrator is arranged between the color filter and the condenser lens.

21. A projection television comprising the image display apparatus of claim 1.

22. A video projector comprising the image display apparatus of claim 1.

23. An image display apparatus, comprising:

a light source for producing light;

a reflecting mirror for reflecting the produced light;

a reflection display, including a plurality of micromirrors, at least one micromirror being adjustable so as to reflect light received from the reflecting mirror to a display; and a projection lens for receiving light from the reflection display and for projecting the received light onto the display, wherein the reflecting mirror is constituted by a single concave mirror, and wherein the single concave mirror is arranged to be inclined with respect to an optical axis of the light source.

24. The image display apparatus of claim 23, wherein the light source includes a light and a collector mirror.

25. The image display apparatus of claim 24, further comprising a color filter for producing colored light from the light source.

26. The image display apparatus of claim 23, further comprising a condenser lens for condensing light prior to the reflecting mirror.

27. The image display apparatus of claim 23, wherein an optical axis of the light source is substantially parallel to an optical axis of the projection lens.

28. The image display apparatus of claim 23, wherein an optical axis of the light source is substantially perpendicular to an optical axis of the projection lens.

29. A projection television comprising the image display apparatus of claim 23.

30. A video projector comprising the image display apparatus of claim 23.

\* \* \* \* \*